US 11,199,286 B1

(12) United States Patent
Beranek et al.

(10) Patent No.: US 11,199,286 B1
(45) Date of Patent: Dec. 14, 2021

(54) BUSHING SHIELD FOR FIRE DETECTION

(71) Applicant: Evergreen Tool Company, Inc., Peshtigo, WI (US)

(72) Inventors: Joseph J. Beranek, Marinette, WI (US); Brian T. Levenson, Jr., Menominee, MI (US)

(73) Assignee: EVERGREEN TOOL COMPANY, INC., Peshtigo, WI (US)

(*) Notice: Subject to any disclaimer, the term of this patent is extended or adjusted under 35 U.S.C. 154(b) by 189 days.

(21) Appl. No.: 16/592,871

(22) Filed: Oct. 4, 2019

(51) Int. Cl.
*F16L 55/115* (2006.01)
*A62C 37/46* (2006.01)
*F16L 55/11* (2006.01)
F16J 15/16 (2006.01)
F16L 5/04 (2006.01)
H02G 15/013 (2006.01)
H01B 17/58 (2006.01)

(52) U.S. Cl.
CPC .......... *F16L 55/115* (2013.01); *A62C 37/46* (2013.01); *F16L 55/1141* (2013.01); *F16L 55/1152* (2013.01); *F16J 15/168* (2013.01); *F16L 5/04* (2013.01); *H01B 17/583* (2013.01); *H02G 15/013* (2013.01)

(58) Field of Classification Search
CPC ... F16C 1/103; F16C 1/107; F16L 5/06; F16L 55/1026; F16L 55/1141
USPC ............................................. 16/2.1, 2.2, 108
See application file for complete search history.

(56) References Cited

U.S. PATENT DOCUMENTS

| | | | | | |
|---|---|---|---|---|---|
| 2,137,313 | A | * | 11/1938 | Tingle | H02G 3/0675 174/82 |
| 2,471,615 | A | * | 5/1949 | Gladden | F16J 15/56 277/582 |
| 2,517,693 | A | * | 8/1950 | Mead | F16L 5/10 277/585 |
| 3,058,759 | A | * | 10/1962 | McDuff | F16L 5/02 277/622 |
| 3,076,655 | A | * | 2/1963 | Washburn, Jr. | F16J 15/022 277/500 |
| 3,451,483 | A | * | 6/1969 | Elliott | A62C 37/10 169/37 |
| 3,463,236 | A | * | 8/1969 | Flajole | A62C 37/12 169/42 |
| 5,037,140 | A | * | 8/1991 | Anderson | F16L 5/06 285/139.2 |
| 5,408,740 | A | * | 4/1995 | Dee | H01B 19/00 174/152 R |
| 5,645,128 | A | * | 7/1997 | Schwall | A62C 37/44 16/48.5 |
| 5,836,048 | A | * | 11/1998 | Rossman | H02G 3/083 16/2.2 |

(Continued)

*Primary Examiner* — Robert K Arundale
*Assistant Examiner* — Richard K. Durden
(74) *Attorney, Agent, or Firm* — Donald J. Ersler

(57) ABSTRACT

A bushing shield is used primarily but not exclusively in a commercial kitchen fire suppression system where pipes and EMT (electric metallic tube) carry detection line cables from a fusible link to a detection control. The bushing shield includes a guide bushing and a vapor barrier. The bushing shield minimizes grease vapors and foreign contaminant migration into a pipe or EMT of the commercial kitchen fire suppression system by forming a barrier, while simultaneously allowing the detection line cable to slide back and forth as intended by the fire suppression system manufacturer.

15 Claims, 4 Drawing Sheets

(56) References Cited

U.S. PATENT DOCUMENTS

| | | | |
|---|---|---|---|
| 5,871,056 A * | 2/1999 | Renna | A62C 37/12 169/43 |
| 5,950,381 A * | 9/1999 | Stansbie | F16L 5/10 52/220.8 |
| 9,702,487 B2 | 7/2017 | Rose, Jr. | |
| 2004/0094951 A1 * | 5/2004 | Sigrist | F16L 5/06 285/139.1 |
| 2013/0112475 A1 * | 5/2013 | Magno, Jr | H02G 15/013 174/77 R |
| 2016/0126715 A1 * | 5/2016 | Bigeh | H02G 3/083 439/676 |

* cited by examiner

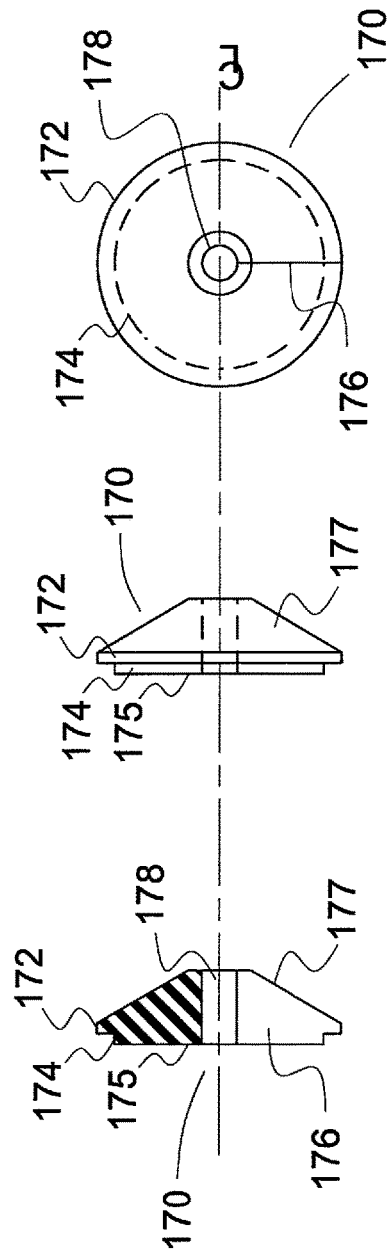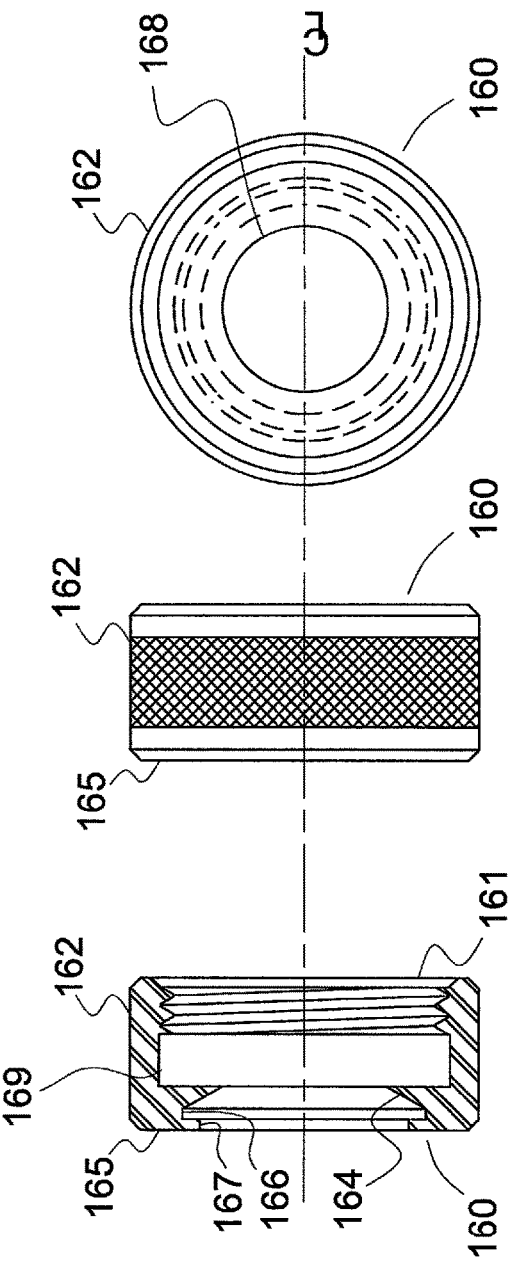

BUSHING SHIELD FOR FIRE DETECTION

BACKGROUND OF THE INVENTION

1. Field of the Invention

The present invention relates generally to fire prevention and more specifically to a bushing shield for a fire detection system, which shields grease vapors and foreign contaminants, originating from the commercial kitchen cooking appliance oil to the fire suppression system pipe and EMT (electric metallic tube) that carries the linear detection cable to the fire suppression control system.

2. Discussion of the Prior Art

Grease laden vapors are emitted from cooking equipment when cooking oil is heated to its boiling point. The vapors penetrate the atmosphere in and around the cooking appliances including fryers, griddles, ranges, and broilers. Restaurants go to expensive lengths to remove the odorous vapors from the cooking area. Kitchen Ventilation Hoods are designed to remove the grease vapors before they become a nuisance including a fire hazard. Vapors collect, solidify, and attract contaminants when cooled. The cooled grease vapors can clog the pipe or EMT making thick sludge. Kitchen fire suppression systems are designed with heat detection currently available using fusible links, electric detection and manual actuation to suppress fire when the cooking oil vapors ignite. Fusible links are a cost-effective means to actuate the fire suppression system. The fusible links are fixed temperature heat detecting device used to restrain the operation of an electrical or mechanical control until the designed temperature is reached, allowing separation of the link and system operation.

The fusible links are held within the detector linkage. The detector linkage is located within the detector bracket. The fusible links are connected to the mechanical control unit via a steel cable. When the cable leaves the detector bracket it travels through a protective pipe or EMT. The end of the pipe or EMT facing the cooking area is open to the elements including the grease vapors.

In a fire situation the temperatures above the cooking appliances and inside the ventilation hoods and plenums reach auto combustion. At the predetermined temperature below the auto combustion temperature, the fusible links release, actuating the fire suppression system. The detection cable tension is released back to the mechanical control sending the suppression agent to the nozzles.

U.S. Pat. No. 9,702,487 to Rose Jr. describes a debris blocking device for the hood fire suppression system that is located inside the EMT conduit connector. A situation can arise when the commercial kitchen ventilation systems including the fire suppression piping, nozzles and detection system are periodically cleaned to remove the grease and foreign contaminants. Hood cleaners often use harsh cleaning chemicals and power washing techniques to remove the grease sediment from the hood, hood filters and other equipment above the cooking appliances. Although grease is removed from the detection bracket and piping exterior, the inside of the piping or EMT remains grease laden. This area is included in the "inaccessible area" for hood cleaning. Plugs in the EMT conduit can become dislodged from water pressure, leaving the open unprotected or plugged from the debris blocking device.

Accordingly, there is a clearly felt need in the art for a bushing shield for a fire detection system, which prevents oil from penetrating a fire detection system through a system pipe; relates to the design and function of guide bushing collar and vapor shield as it relates to the structural integrity; the replaceability of the vapor shield; and provides a simultaneous linear and radial guide, while deflecting solid and liquid objects that may be suspended by atmospheric gases.

SUMMARY OF THE INVENTION

The present invention provides a bushing shield for fire detection system, which shields grease vapors and foreign contaminants from a suppression system pipe and EMT. A bushing shield is used primarily but not exclusively in a commercial kitchen fire suppression system where pipes and EMTs carry detection line cables from a fusible link to a detection control. The bushing shield includes a guide bushing and a vapor barrier. The bushing shield minimizes grease vapors and foreign contaminant migration into a pipe or EMT of the commercial kitchen fire suppression system by forming a barrier, while simultaneously allowing the detection line cable to slide back and forth as intended by the fire suppression system manufacturer.

Accordingly, it is an object of the present invention to provide a bushing shield for fire detection system, which is resistant to unintentional removal from an EMT connector during hood cleaning or kitchen equipment vibration.

It is further object of the present invention to easily replace a vapor shield during the fire code required annual fire suppression maintenance, Grease buildup around the detection cable can solidify over time and deter the cable from acting as designed.

It is another object of the present invention to provide a compressible vapor shield for installation in a guide bushing to minimize a potential leak point around the cable.

Finally, it is another object of the present invention to allow a detection cable from moving as required in the fire suppression system detection system.

These and additional objects, advantages, features and benefits of the present invention will become apparent from the following specification.

BRIEF DESCRIPTION OF THE DRAWINGS

FIG. 2a is a side view of a vapor barrier in accordance with the present invention.

FIG. 2b is a side cross sectional view of a vapor barrier in accordance with the present invention.

FIG. 2c is an end view of a vapor barrier in accordance with the present invention.

FIG. 3a is a side view of a guide bushing in accordance with the present invention.

FIG. 3b is a side cross sectional view of a guide bushing in accordance with the present invention.

FIG. 3c is an end view of a guide bushing in accordance with the present invention.

DETAILED DESCRIPTION OF THE PREFERRED EMBODIMENTS

Figure 1:
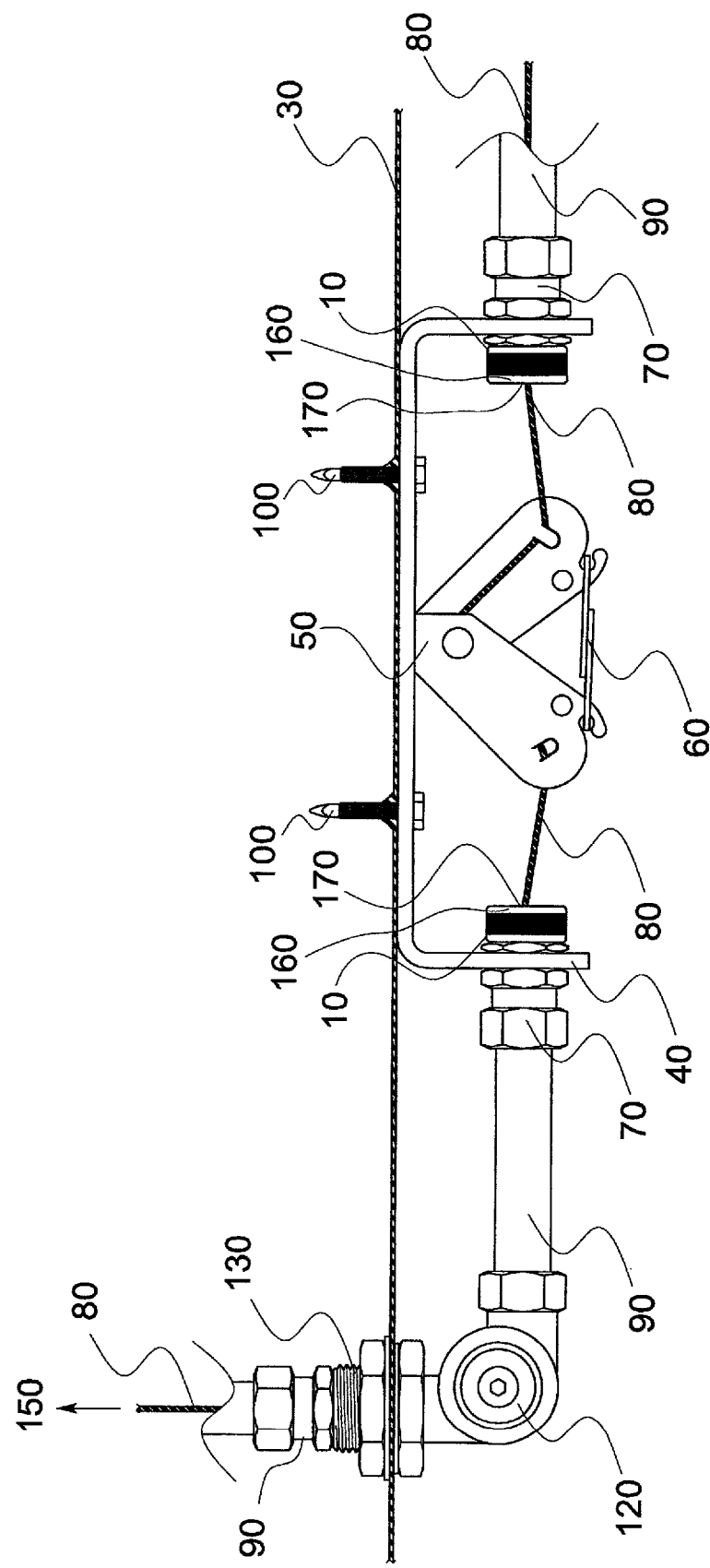
FIG. 1 is a side view of a bushing shield installed on a fire detection system in accordance with the present invention.

FIG. 1 shows a position of a fire detection system in relationship to a cooking surface (not shown), a bushing shield (10) threaded to a compression fitting (70), which is secured to a detector bracket (40). The detector bracket (40) is attached to a ventilation hood (30) with a plurality of fasteners (100). A detection line cable (80) acts as a linkage between a release mechanism control unit (150) and a fusible link (60) held by a detector linkage (50). The detection line cable (80) penetrates the ventilation hood (30) through a grease tight hood seal adaptor (130) with a direction change via a pulley elbow (120). The detection line cable (80) rides within an EMT (90) from a release mechanism to the compression fitting (70).

With reference to FIGS. 3a-3c, the bushing shield (10) may be comprised of a single material, a homogeneous material, or a component assembly of multiple materials. The bushing shield (10) preferably includes a guide bushing (160) and a vapor barrier (170). The vapor barrier (170) preferably includes a slit 176 for ease of installation. The guide bushing (160) preferably includes threads (161) formed in one end for threadable engagement with male threads (190) of the compression fitting (70). However, the guide bushing (160) may be attached to a conduit (90) of the compression fitting (70) with any other suitable connection device, such as tension or compression. The threads (161) are one type of connection device. The guide bushing (160) includes an outside diameter (162), a beveled seat (164) and an entrance inner diameter (167). A bushing face (165) is formed on the opposing end of the guide bushing (160). The beveled seat (164) is formed in the opposing end of the guide bushing (160). The beveled seat (164) includes a major inner diameter (166) and a minor diameter (168). The inside entrance inner diameter (167) is formed in the opposing end of the guide bushing (160) to communicate with the beveled seat (164).

With reference to FIGS. 2a-2c, the vapor barrier (170) includes an outside diameter (172), a face diameter (174), a face (175), the slit (176), a beveled face (177) and a cable diameter (178). The beveled face (177) is formed on one end of the vapor barrier (170) and the face diameter (174) is formed on an opposing end of the vapor barrier (170). The face (175) is formed on the opposing end of the vapor barrier (170). The cable diameter (178) is formed through the vapor barrier (170). The major inner diameter (166) of the guide bushing (160) is sized to receive the outside diameter (172) of the vapor barrier (170). The beveled seat (164) of the guide bushing (160) is sized to receive and make contact with the beveled face (177) of the vapor barrier (170). The beveled seat (164) is terminated by a central recess (169) on one end and terminated by the major inner diameter (166) on an opposing end. The beveled face (177) of the vapor barrier (170) extends into the central recess (169) and the central recess (169) allows the threads (161) to be fully formed. The central recess (169) is terminated by the threads (161) on an opposing end. The contact of the vapor barrier (170) with the inside the guide bushing (160) provides a uniform surface of deflection. The outside diameter (162) is preferably knurled, splined or machined in some other way to aid in installation. However, the outside diameter (162) may also have the shape of a hexagon or an octagon.

The cable diameter (178) may be smaller than that of the detection line cable (80) or other guided object passing through it to provide a positive seal, or larger than that of the object passing through to provide a limited friction contact zone. The face (175) of the vapor barrier (170) provides a surface for deflection of extraneous objects. Opposite the face (175) is the beveled face (177) constructed at an angle, identical to that of the beveled seat (164) in the guide bushing (160). The face (175) makes contact with the fitting (70) or the conduit (90) during installation of the bushing shield (10).

Figure 4:
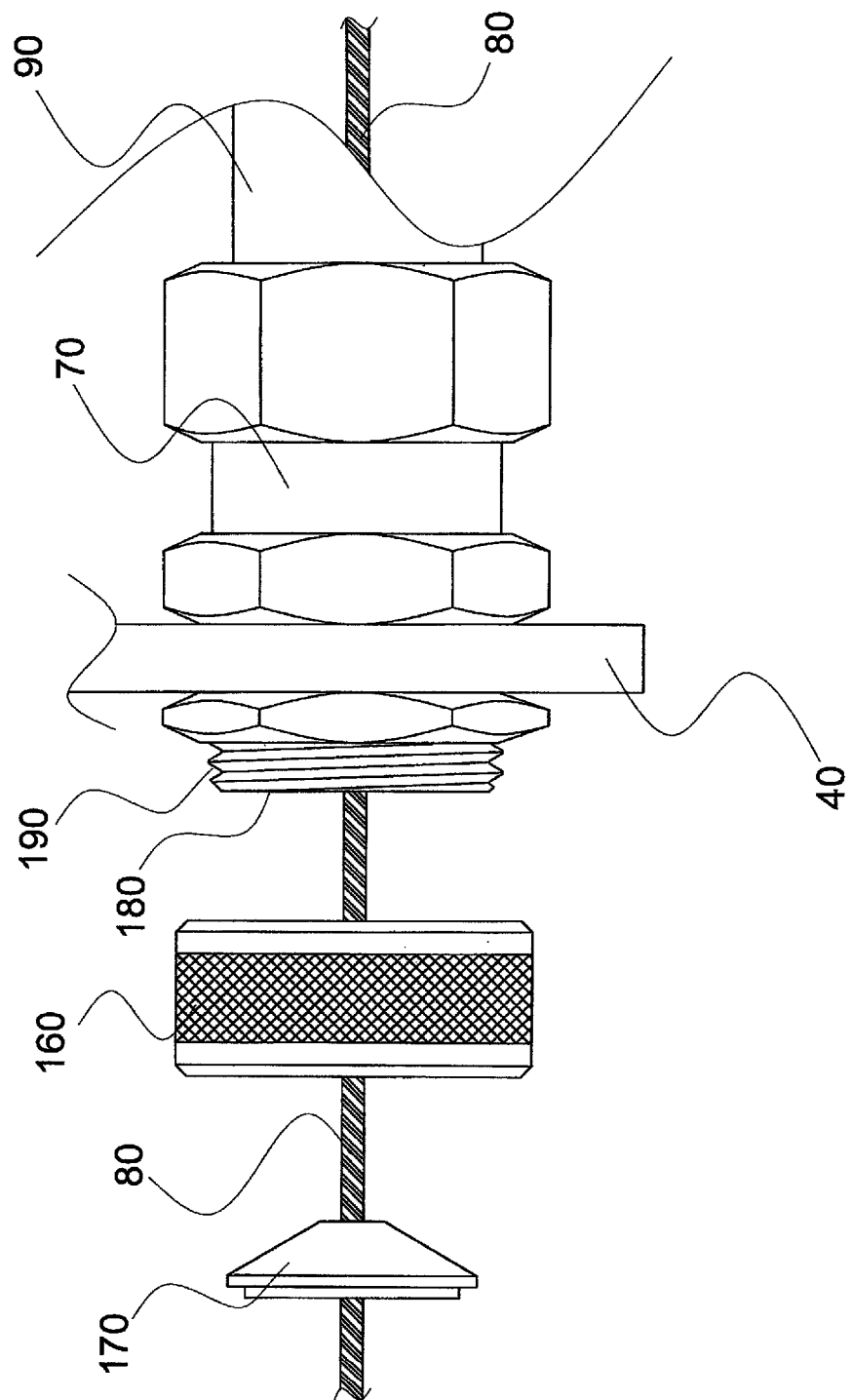
FIG. 4 is an enlarged exploded side view of a bushing shield retained on a detection line cable a fire detection system in accordance with the present invention.
Figure 5:
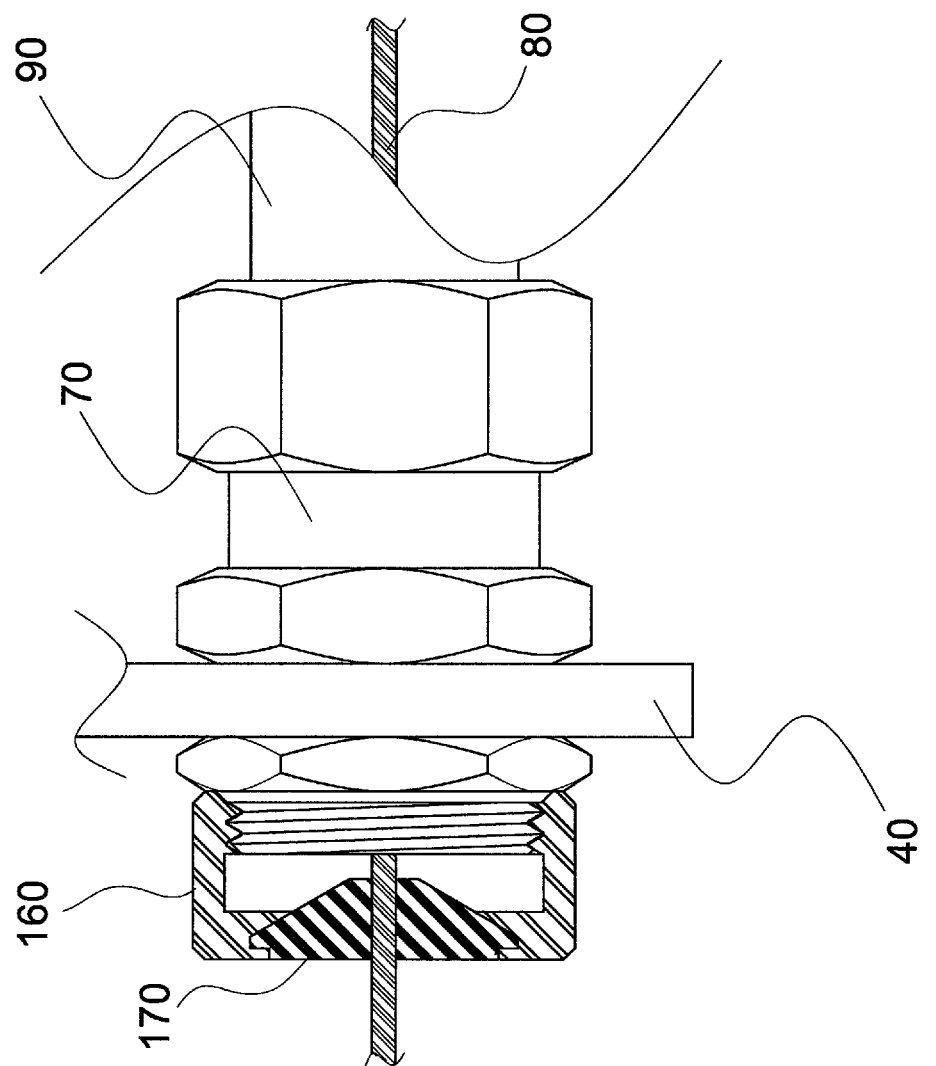
FIG. 5 is a cross sectional view of a bushing shield with a vapor barrier retained therein, a line cable is inserted through the vapor barrier and the bushing shield is threaded on to a compression fitting of a bushing shield for fire detection in accordance with the present invention.

FIG. 4 discloses a relationship between the guide bushing (160) with the vapor barrier (170), compression fitting (70), detector bracket (40) and the detection line cable (80). The compression fitting (70) is a means for the EMT (90) to end, while the detection line cable (80) continues through the detection bracket (40). The compression fitting (70) includes two ends, one tightening around the EMT (90) while the other end (180) is open inside the detection bracket (40). The guide bushing (160) is threadably engaged with the male threads (190) of the compression fitting (70). The vapor barrier (170) snaps into the guide bushing collar (160). The vapor barrier (170) includes the cable diameter (178), which is slightly larger than the detection line cable (80). The vapor barrier (170) is fabricated from a resilient material, which includes the ability to return to its original shape when compressed or stretched. The material is preferably silicone, but other materials may also be used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A bushing shield for retention on an end of a conduit configured for shielding a line cable of a fire detection system comprising:
   a vapor barrier including a beveled face formed on one end and a face diameter formed on an opposing end, a cable diameter is formed through said vapor barrier; and
   a guide bushing including a connection device formed in one end, and an entrance inner diameter formed in an opposing end, a major inner diameter is formed past said entrance inner diameter, a beveled seat extends from said major inner diameter to a central recess, said central recess extends from said beveled seat to said connection device, wherein said beveled seat is sized to receive said beveled face of said vapor barrier,
   wherein said cable diameter is configured to retain the line cable.

2. The bushing shield for retention on an end of a conduit configured for shielding a line cable of a fire detection system of claim 1 wherein:
   said vapor barrier is fabricated from a resilient material.

3. The bushing shield for retention on an end of a conduit configured for shielding a line cable of a fire detection system of claim 1 wherein:
   a slit is formed from an outside diameter of said vapor barrier to said cable diameter.

4. The bushing shield for retention on an end of a conduit configured for shielding a line cable of a fire detection system of claim 1 wherein:
   an outside diameter of said guide bushing is knurled, splined or machined to aid in installation.

5. The bushing shield for application to an end of a conduit configured for shielding a line cable of a fire detection system of claim 1 wherein:

said guide bushing does not provide adjustable hoop compression of an outside diameter of said vapor barrier.

6. A bushing shield for retention on an end of a conduit configured for shielding a line cable of a fire detection system comprising:

a vapor barrier including an outside diameter, a beveled face formed on one end and a face diameter formed on an opposing end, said beveled face extends from said outside diameter, a cable diameter is formed through said vapor barrier; and a guide bushing including a female thread formed in one end, an entrance inner diameter formed in an opposing end, a major inner diameter is formed past said entrance inner diameter, a beveled seat extends from said major inner diameter to a central recess, said central recess extends from said beveled seat to said female thread, wherein said beveled seat is sized to receive said beveled face of said vapor barrier, said vapor barrier is axially retained between said entrance inner diameter and said beveled seat, wherein said cable diameter is configured to retain the line cable.

7. The bushing shield for retention on an end of a conduit configured for shielding a line cable of a fire detection system of claim 6 wherein:

said vapor barrier is fabricated from a resilient material.

8. The bushing shield for retention on an end of a conduit configured for shielding a line cable of a fire detection system of claim 6 wherein:

a slit is formed from said outside diameter of said vapor barrier to said cable diameter.

9. The bushing shield for retention on an end of a conduit configured for shielding a line cable of a fire detection system of claim 6 wherein:

an outside diameter of said guide bushing is knurled, splined or machined to aid in installation.

10. The bushing shield for application to an end of a conduit configured for shielding a line cable of a fire detection system of claim 6 wherein:

said guide bushing does not provide adjustable hoop compression of said outside diameter of said vapor barrier.

11. A bushing shield for retention on an end of a conduit configured for shielding a line cable of a fire detection system comprising:

a vapor barrier including an outside diameter, a beveled face formed on one end and a face diameter formed on an opposing end, said beveled face extends from said outside diameter, a cable diameter is formed through said vapor barrier; and a guide bushing including a female thread formed in one end, an entrance inner diameter formed in an opposing end, a major inner diameter is formed past said entrance inner diameter, a beveled seat extends from said major inner diameter to a central recess, said central recess extends from said beveled seat to said female thread, wherein said beveled seat is sized to receive said beveled face of said vapor barrier, said vapor barrier is axially retained between said entrance inner diameter and said beveled seat, said beveled face extends into said central recess, wherein said cable diameter is configured to retain the line cable.

12. The bushing shield for retention on an end of a conduit configured for shielding a line cable of a fire detection system of claim 11 wherein:

said vapor barrier is fabricated from a resilient material.

13. The bushing shield for retention on an end of a conduit configured for shielding a line cable of a fire detection system of claim 11 wherein:

a slit is formed from said outside diameter of said vapor barrier to said cable diameter.

14. The bushing shield for retention on an end of a conduit configured for shielding a line cable of a fire detection system of claim 11 wherein:

an outside diameter of said guide bushing is knurled, splined or machined to aid in installation.

15. The bushing shield for application to an end of a conduit configured for shielding a line cable of a fire detection system of claim 11 wherein:

said guide bushing does not provide adjustable hoop compression of said outside diameter of said vapor barrier.

\* \* \* \* \*